(12) United States Patent
Vidaurre Heiremans et al.

(10) Patent No.: US 9,498,745 B2
(45) Date of Patent: Nov. 22, 2016

(54) SYSTEM FOR RECOVERING AND RECYCLING ACID MIST GENERATED IN ELECTROLYTIC CELLS FOR ELECTROWINNING OR ELECTROREFINING NON-FERROUS

(71) Applicant: Victor Eduardo Vidaurre Heiremans, Las Condes, Codigo Postal (CL)

(72) Inventors: Victor Eduardo Vidaurre Heiremans, Las Condes, Codigo Postal (CL); Edgardo Enrique Beltran Navarro, Peñalolenen (CL)

( * ) Notice: Subject to any disclaimer, the term of this patent is extended or adjusted under 35 U.S.C. 154(b) by 0 days.

(21) Appl. No.: 14/899,305

(22) PCT Filed: Jun. 18, 2014

(86) PCT No.: PCT/CL2014/000026
§ 371 (c)(1),
(2) Date: Dec. 17, 2015

(87) PCT Pub. No.: WO2014/201579
PCT Pub. Date: Dec. 24, 2014

(65) Prior Publication Data
US 2016/0158686 A1    Jun. 9, 2016

(30) Foreign Application Priority Data

Jun. 19, 2013  (CL) .................................. 1789-2013

(51) Int. Cl.
*C25C 7/00* (2006.01)
*C25D 21/04* (2006.01)
*B01D 47/02* (2006.01)
*C25C 1/00* (2006.01)
*B01D 53/00* (2006.01)
*C25C 7/06* (2006.01)

(52) U.S. Cl.
CPC ........... *B01D 47/021* (2013.01); *B01D 53/002* (2013.01); *C25C 1/00* (2013.01); *C25C 7/00* (2013.01); *C25C 7/06* (2013.01)

(58) Field of Classification Search
CPC ........ C25C 7/00; C25D 21/04; B01D 53/002
USPC ....... 55/385.1, 456; 204/229.8, 288.2, 228.6, 204/228.1, 228.7, 240, 276, 288, 289, 279
See application file for complete search history.

(56) References Cited

FOREIGN PATENT DOCUMENTS

EP    WO 2014/121300 A1 *  8/2014  ............. C25D 21/04

* cited by examiner

*Primary Examiner* — Jacob T Minskey
*Assistant Examiner* — Minh-Chau Pham
(74) *Attorney, Agent, or Firm* — Karim Lagobi

(57) ABSTRACT

Acid mist is extracted from electrolytic cells and conveyed to a first device for trapping electrolyte droplets and condensing the hazardous contaminating sulfuric acid vapors, then gaseous discharges are collected in a manifold, and the first devices are either connected directly to a second multi-chamber device for condensing the acid waste vapors that have not been trapped, which is connected to a gas extractor system which exhausts said gas either directly to the atmosphere or to a chemical treatment system for purification prior to discharge; or alternatively, the manifold discharges directly to an extractor system, which in turn discharges either directly to a centralized waste gas and vapor removal system or to the atmosphere.

8 Claims, 4 Drawing Sheets

FIGURE 2.1
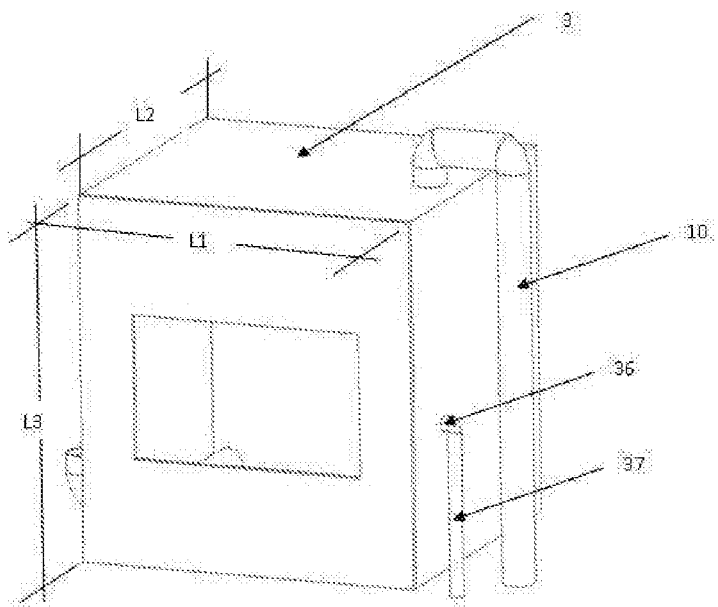
FIGURE 2.2
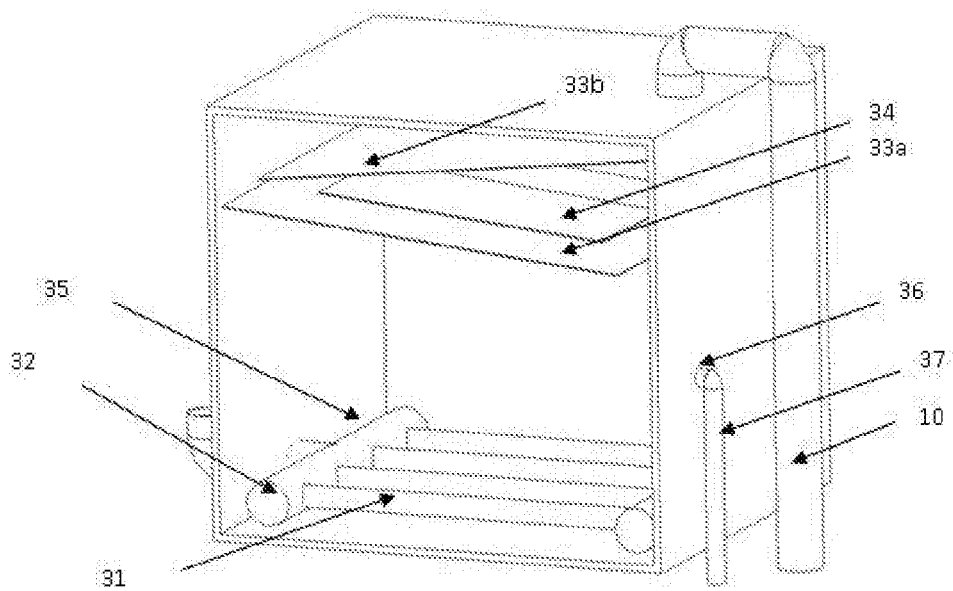

FIGURE 3.1
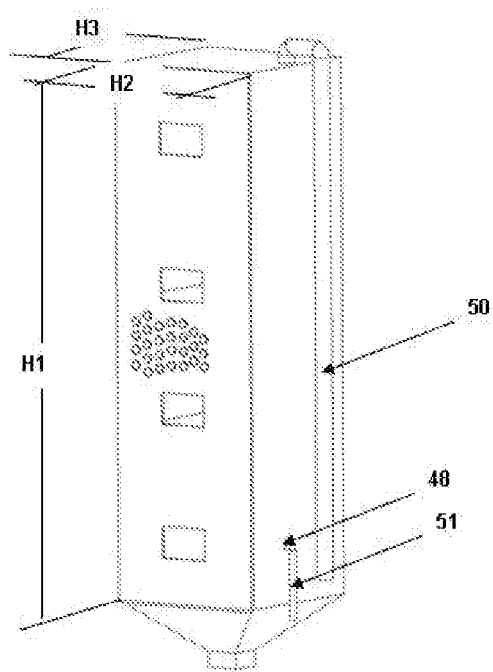
FIGURE 3.2
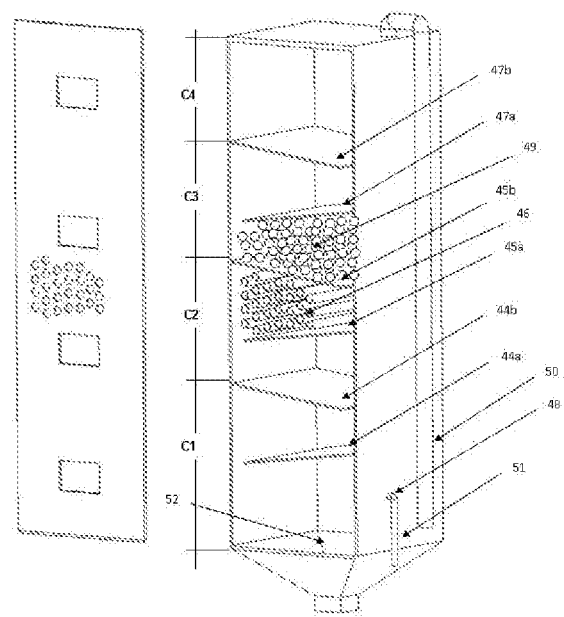

FIGURE 3.3
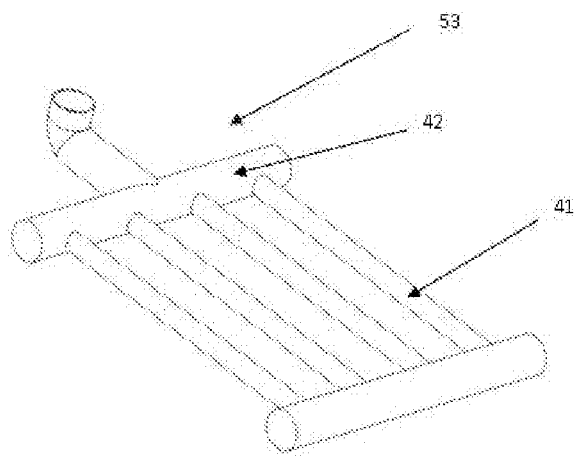
FIGURE 4
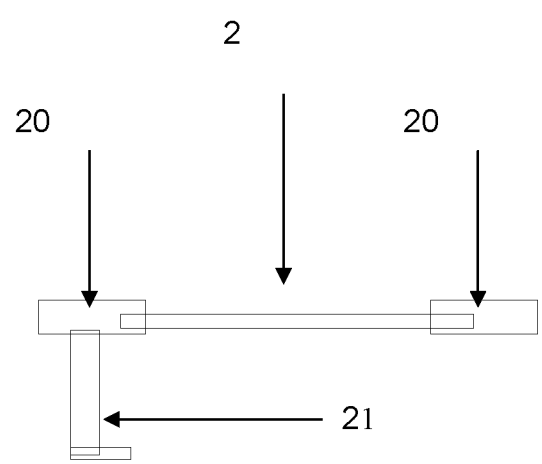

SYSTEM FOR RECOVERING AND RECYCLING ACID MIST GENERATED IN ELECTROLYTIC CELLS FOR ELECTROWINNING OR ELECTROREFINING NON-FERROUS

CROSS-REFERENCE TO RELATED APPLICATIONS

The present application claims priority to PCT application number PCT/CL2014/000026, filed on Jun. 18, 2014, of which the present application is a United States national stage application, and Chilean patent application number 1789-13, filed on Jun. 19, 2013, the content of each of which in its entirety is included herein by reference.

FIELD OF THE INVENTION

The present invention refers to controlling the emission of gases in cells for electrorefining or electrowinning non ferrous metals; more specifically, the present invention is a system for Recovering and/or recycling acid mist which may be generated during electrowinning of non-ferrous metals.

BACKGROUND OF THE INVENTION

During the electrowinning process of non-ferrous metals from acid solutions in electrolytic cells, principally Copper (Cu) and Zinc (Zn), oxygen bubbles are generated on the surfaces of insoluble anodes and ascend to the surface of the electrolyte. The bubbles in their ascent not only grow in size and increase their velocity, but also capture water and sulfuric acid vapors from the electrolyte, which become incorporated in each bubble. In the case of cells equipped with Soft Aeration System for sparging air into the electrolyte, a similar phenomenon occurs with the air bubbles diffused near the cell bottoms. Immediately before reaching the surface of the electrolyte, the bubbles contain a mixture of gases (air and oxygen) and vapors (water and sulfuric acid) and are enveloped by a film (a thin layer) of electrolyte. Upon emerging from the surface of the electrolyte to the atmosphere, the bubbles explode, causing the film to collapse into small fragments that are projected upwards above the surface in the form of airborne very fine drops of electrolyte that accompany the contents of escaping gases and vapors to the surrounding atmosphere, thus forming the complex and problematic acid mist.

In the Tankhouse working environment, acid mist constitutes a severe occupational health hazard, and thus its concentration limits in the atmosphere are established in corresponding Health and Work Safety Protocols and Regulations; in addition, acid mist causes multiple well known operational inconveniences, such as equipment corrosion and Copper Sulfate ($CuSO_4$) crystallization build ups, that induce current leaks and short-circuits. Therefore it is compulsory to effectively control acid mist.

To properly address that task, it is pertinent to define conceptually what we understand by acid mist, which for the effects of this patent application is considered an airborne mist formed by 2 phases, as follows:

1. A gaseous phase constituted by:
   a. Permanent gases: oxygen originated in the electrolytic process, and oxygen and nitrogen of the air infiltrated into the cell from the Tankhouse environment, and air coming from the electrolyte air sparging.
   b. Vapors of water as well as of sulfuric acid resulting from evaporation of the electrolyte which is captured by ascending bubbles through the electrolyte.
2. A liquid phase (electrolyte) dispersed in the gaseous phase in the form of very tiny droplets, due to the projection of particles of electrolyte by collapse of the liquid film that surrounds the surface of the bubbles when they reach the surface of the electrolyte and explode.

Furthermore, It must be remembered that in gas handling technology, "vapors" are defined as any component of a gaseous phase that is condensed by simple chilling to temperatures slightly below ambient atmospheric pressure; and "permanent gases" are any component of a gaseous phase that requires temperatures significantly below 0° C. and pressures substantially above atmospheric pressure to condense or liquefy.

Consequently, in this application we shall understand acid mist as indicated above, that is to say, simply the mixture of permanent gases (oxygen and nitrogen) and water vapor with very fine airborne droplets of electrolyte and vapors of sulfuric acid, the latter two being the hazardous and dangerous contaminants to the workplace ambient.

Existing technology utilizes various techniques to control acid mist in the workplace ambient atmosphere, and among them, we can mention the use of confining means over the electrolyte, such as floating plastic balls to diminish the projections of electrolyte droplets, together with porous mesh covers or blankets; and nonporous rigid covers such as hoods placed on top of the cells; however, both types of covers present a series of shortcomings and inconveniences as described in Chilean Patent Application N° 1056-2013.

Whichever system is used in the cells for confinement, acid mist must be continuously extracted, otherwise, the gases and vapors continuously generated by the electrolytic process would inevitably raise the pressure in the volume of confinement over the electrolyte above the atmospheric pressure of the Tankhouse, thus initiating a leak flow of acid mist from the cells to the Tankhouse. To avoid the above phenomenon, the extraction must be accompanied by a slight depression in the confinement volume sustained in time, so that the gaseous flow is always from the Tankhouse to the cell and not in reverse, which necessarily implies that there must be a continuous infiltration of outside air from the Tankhouse into the confinement volume in the cell.

In existing systems of acid mist control used in industrial Tankhouses, after capture confinement by hoods or other covers, acid mist is extracted from the confinement volume in the cells by external suction, and is driven through a network of collector ducts from each cell to a centralized cleaning equipment that treats the acid mist generated by a plurality of cells in a Tankhouse in one centralized process prior to discharge to the atmosphere. However, existing acid mist control systems cannot assure continuous sustained compliance of the mandatory maximum content limits of contaminants in the working areas surrounding the cells in the Tankhouse. The latter solution works by simple dilution of the contaminant electrolyte droplets and vapors of sulfuric acid in a very large volume of air infiltrated from the Tankhouse which is sucked into each cell. This solution presents several operational shortcomings and inconveniences, the principal one of which being the high energy requirement necessary to dilute the contaminants with infiltrated air, vacuum up the large resulting volume of contaminated air and drive the acid mist from each cell through a maze of ducts feeding a remote centralized equipment to clean it prior to discharge back to atmosphere.

Moreover, there are significant secondary problems derived from the high flows of acid mist driven through the maze of ducts: (1) the need for systematic, frequent cleaning and maintenance of the hoods, and especially the ducts, so that they remain free of obstructions from CuSO4 crystallization buildups at all times, in order not to decrease the effectiveness of the remote centralized contaminated air cleaning equipment; and (2) high corrosion of all equipment and Tankhouse installations.

As already mentioned, the high energy consumption is a direct consequence of the present strategy of dilution of the contaminants, acid vapors and electrolyte droplets by a great volume of air infiltrated into each cell from the Tankhouse environment; such contaminated gaseous volume must inevitably travel considerable distances to reach the cleaning installations outside the Tankhouse; therefore, a high energy requirement must be spent. The latter is the main technical problem the present invention resolves, with the added advantage that the solution proposed also resolves well and effectively all the secondary problems mentioned above.

On the other hand, existing systems of capture and confinement based on non-porous covers of the hood type, in addition to their high energy consumption, suffer from a very serious technical environmental shortcoming in that the covers require removal from each cell in order to harvest the cathodes. In effect, upon uncovering the energized cells in operation, the accumulated confined volume of acid mist is discharged directly to the cell work environment until harvesting is finished, and furthermore, the exposed electrolyte continues emitting acid vapors and drops of electrolyte uncontrollably to the global environment of the Tankhouse. Due to the shortcoming mentioned while cells are being harvested, the maximum allowed concentration limits of hazardous substances in the vicinity of the work area far exceeds the corresponding Health and Work Safety Protocols and Regulations that protect industrial hygiene and occupational health of workers. To specifically resolve the latter technical environmental problem, the inventor of the present invention has developed a preferred realization of a "system for individual capture and confinement of acid mist for each cell", disclosed in Chilean Patent application N° 1056-2013. In the latter patent application, a novel cell cover system is proposed with individual, impermeable, thermally insulated barriers that overcome the acid mist capture and confinement shortcomings and deficiencies of the devices used in the prior art. The novel covers, at the same time, actually diminish the volume of acid mist generation in the electrowinning process of non-ferrous metals by minimizing the volume for confinement inside the cell, while maintaining the acid mist in permanent and continuous confinement in the assigned space in each cell, as the barrier cover stays in place in the cell and is not required to be removed in order to harvest cathodes from the cell.

SUMMARY OF THE INVENTION

Embodiments of the invention are based on fundamental key environmental practices to solve the problem of acid mist control in an effective and efficient manner, which are based on elemental principles of sound and effective environmental and effluent problem management, as follows:

1. "Eliminate the generation of contaminated effluents in the process; and if this is not possible, reduce contaminant generation"—as is the case of electrowinning cell of non-ferrous metals that generates acid mist from acid electrolytes.

2. "Minimize the flows of contaminated effluents", which diminishes the size and capacity of the equipment needed to clean effluents, because, on one hand smaller volumes are handled, and on the other, the concentration of contaminants in the flows is larger, facilitating removal.

3. "Remove the contents of contaminant from the effluent before discharging to the, ambient; and implement the removal as close as possible from the generation point".

4. Catch the contaminants in a manner such that:
   they can be recycled back to the original process
   and/or, they have commercial value
   or at last, they can be disposed in an environment friendly manner Accordingly, the abatement, meaning the treatment of removal and catching of contaminants in the present invention, deviates radically from the prior art, as it is done with a minimum dilution, that is to say, with minimum infiltration of air from the Tankhouse into each cell; and the abatement of contaminants is done as close as possible to the cell where they are generated, without a network of ducts, and the useful and valuable components in the acid mist, such as, water, sulfuric acid and electrolyte are substantially recuperated immediately in situ and recycled back immediately for reuse in the process.

With respect to the magnitude of the volume of acid mist required to be confined in each cell, it is worth stressing, that:

Conceptually, the minimum theoretical extraction volume of acid mist per unit of time, or extraction flow, is equal to the volume acid mist generated by the cell in its operating conditions per unit of time, and this is precisely the key concept used in the present invention It is essential to maintain a stable depression sustained in time to keep the acid mist generated by each cell permanently confined within its volume of confinement, and furthermore, and also indispensable—for reasons of ambient contamination in the work areas of the cell vicinity—to assure that such depression is maintained at all times stable in the confinement volume, especially when cathodes are removed from each cell during harvesting periods.

According to our experience, the cover described in the above-mentioned Chilean Patent Application, that is a non porous, impermeable and thermally insulated cell cover, equipped with flexible seals allow an ambient air infiltration flow ranging from 10% to 100% with respect to the flow of gasses generated by the process in each cell; this in effect, represents a maximum outside air infiltration of one time the flow of gasses and vapors actually generated in each cell by its own operation, and such total gaseous flow turns out sufficient not only for effective extraction of the acid mist from each cell without causing any contaminant emission to the work environment, but also results in a modest flow, which allows for efficient operation of the System for Recuperation/Recycling proposed in the present invention for substantial removal of contaminants from the acid mist at each cell or in its proximity in an effective manner and with very low energy consumption.

Consequently, the solution this invention proposes contrasts radically with the industrial solutions actually used at present, which is sized to handle, in some cases, more than 10 times the flow of gasses and vapors actually generated by the normal operation of the cell, which as has been said, is the principal responsible for the present unnecessary and very high levels of energy consumption.

BRIEF DESCRIPTION OF DRAWINGS

FIGS. 2.1 and FIG. 2.2 show a preferred realization of the First Device of the System to catch electrolyte droplets and partially condense acid vapors FIGS. 3.1, 3.2 and 3.3 show one preferred execution of the Second Multi-chamber Condenser Device of vapors.

FIG. 4 shows one preferred execution of the Exhaust Rig from a cell.

DETAILED DESCRIPTION OF THE INVENTION

Figure 1:
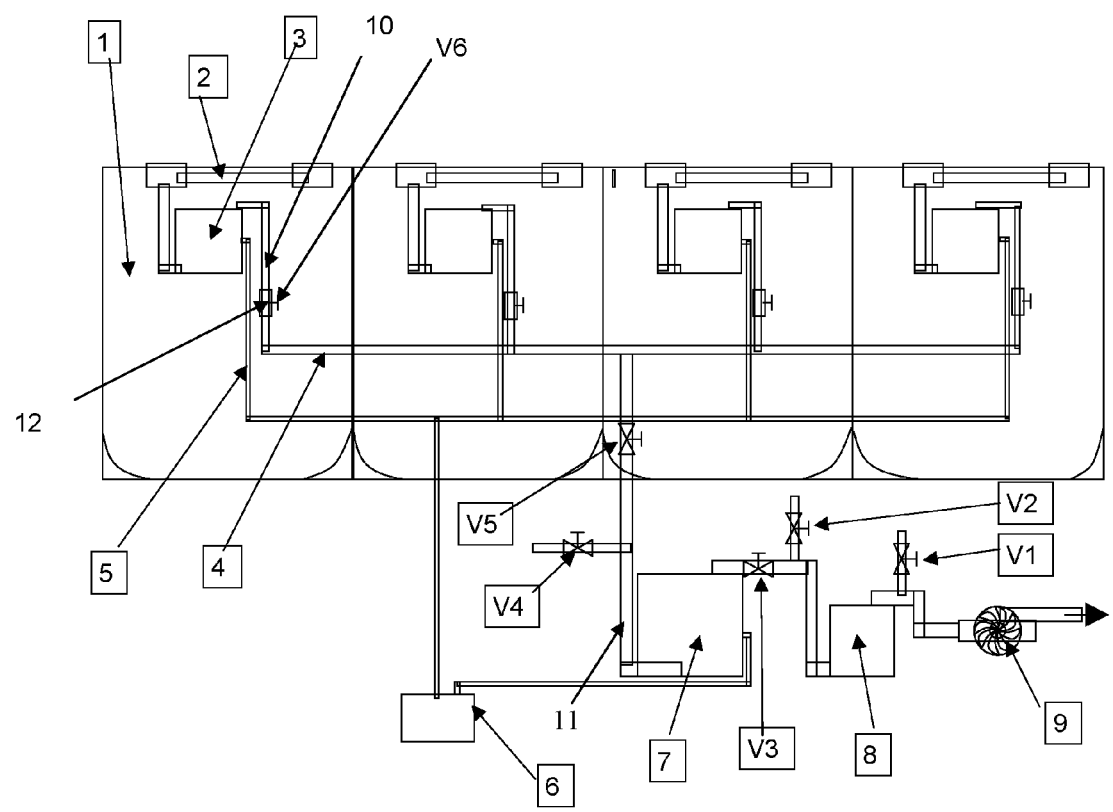
FIG. 1 shows a schematic diagram of a system for Recuperation/Recycling of acid mist in accordance with the present invention, installed for operation with a plurality of 4 Cu electrowinning cells, showing its various elements.

The description of the invention is made on the basis of the several Figures. The present invention proposes a System for Recovery/Recycling acid mist (SIRENA) which basically consists of removal of electrolyte drops and acid vapors contained in the acid mist generated in each of a plurality of non-ferrous metals electrowinning cells, and the invention comprises in each of the cells, 1 an Exhaust Rig, 2, for extracting the acid mist from each cell, followed by and connected to, a First Device, 3, for capturing drops of electrolyte and partially condense sulfuric acid and water vapors contained in the acid mist extracted from the cell, 1. In a preferred embodiment of the invention, the entrapment of drops and condensation of vapors is done by putting in contact the acid mist with an aqueous solution, which generates a volume increase of said solution, which then overflows out of the Device, 3, through hole 36, and vent 37, allowing the reuse of the removed electrolyte, sulfuric acid and condensed water back in the process. The Device, 3, is installed on the exterior of any of the end walls of the cell, or in the vicinity of either of them, and is connected by ducts, 10, to a Collector Manifold, 4, which receives the flows of gases and uncondensed vapors from a plurality of Devices, 3, where the Collector Manifold, 4, connects them through ducts, 11, either to a second Multi-Chamber Condenser Device, 7, which condenses the residual water and sulfuric acid vapors coming out of Devices, 3, which also generates a volume increase of solution which overflows out of the Multi-Chamber Condenser Device, 7, through hole 46, allowing the reuse of the removed electrolyte, sulfuric acid and condensed water back in the process. The Device, 7, is connected, in turn, to an Extraction Turbine, 9, evacuating fluids either to the environment, directly, or to a system of chemical purification of vapors and gases, prior their discharge to the atmosphere, (not shown in figures), or alternatively, to an Extractor System (not shown in figure), which can receive one or a plurality of ducts, downloads 11, where this system discharges either directly to the atmosphere or to a system for the treatment of residual sulfuric acid vapors outside the Tankhouse.

Embodiments of the invention also include a System, 12, for Measurement, Control and Regulation of the extraction flow of acid mist, from each cell, 1, and a System, 8, for Measurement, Control and Regulation of the global flow of acid mist extraction in the System.

In a preferred embodiment of the invention, Exhaust Rig, 2, FIG. 4, continuously removes acid mist from the volume of confinement in each cell through one or a plurality of suction windows, 20, with a total area of aspiration between 50 and 1500 cm², with connections to one or a plurality of ducts, 21, with a total cross-section between 30 and 120 cm² for transporting the flow of acid mist; where the duct sections, 21, can be circular or rectangular, and where the plurality of ducts, 21, feed First Device, 3.

acid mist Exhaust Rig, 2, can be located in any of the end walls of the cell, i.e. the electrolyte in-feed end wall or the spent electrolyte discharge end wall.

In a preferred embodiment of the invention, the First Device, 3, substantially captures drops of electrolyte and partially condenses sulfuric acid and water vapors contained in the extracted acid mist from each cell, installed on or adjacent to each cell, 1, is a rectangular container, of dimensions: length, L1, between 25 and 50 cm; width, L2, between 15 and 40 cm and height, L3, between 25 and 50 cm. The bottom of First Device, 3, is flat or tapered with a discharge valve for sludge removal (not shown in the figure).

The lower bottom of the First Device, 3, is equipped with an acid mist diffuser system, 35, FIG. 2.2, which forces the acid mist to be diffused upwards in the shape of bubbles through a liquid column of height between 5 and 20 cm, measured from the top of the diffuser system, 35; which is comprised of a plurality of parallel, perforated or porous pipes, 31, FIG. 2.2, are fed from a manifold, 32, connected to duct, 21, of the acid mist Exhaust Rigs, 2, in cells, 1. The manifold, 32, has a diameter between 1.0 and 3.0 cm, and perforated or porous pipes, 31, have an inner diameter between 0.63 and 2.54 cm, with a plurality of perforations or porosities of diameters included between 0.05 and 0.5 cm, so that the total perforated area in each First Device, 3, is comprised between 10 and 150 cm².

The First Device, 3, has an overflow hole, 36, FIG. 2.1, at an height comprised between 5 and 25 cm above the level of the bubbler system, by which condensate is discharged by gravity through duct, 37, and then collected and transported towards a common reservoir, 6, for all First Devices, 3, and eventually also to receive the overflow of condensate collected in the Second Multi-Chamber Condenser Device, 7.

The upper portion of First Device, 3, above the overflow vent of condensate, 36, has additionally two or more flat plates or baffles, 33a and 33b, arranged horizontally or oblique to the ascending passage of fluids not trapped by the bubbling in the liquid column in the First Device, 3, where bottom flat plate 33a, has a section of porous material to coalesce liquid particles into drops, 34, that comprises between 20% and 60% of its surface, to catch remnant drops swept away in the emerging gaseous from the bubbler system.

Gases come out of the First Device, 3, by vent, 10, discharging at the Collector Manifold, 4. The collector manifold 4 may connect a plurality of cells through ducts 10, wherein the Collector Manifold, 4, feeds a Second Multi-Chamber Condenser Device, 7, using one or a plurality of ducts, 11.

The Second Multi-Chamber Condenser Device, 7, is an upright body, formed by a plurality of vertically interconnected chambers, which in a preferred embodiment of the invention consist of four chambers, FIGS. 3.1 and 3.2. The global dimensions of the Second Multi-Chamber Condenser Device, 7, depends on the number of First Devices, 3, which concur to it; the upright body is of rectangular or circular cross section between 50 to 600 cm² for each connected First Catcher Device, 3, and a height, H1, between 50 and 300 cm, with both dimensions length H2, and width H3, also dependent on the number of First Devices, 3, connected to the Second Multi-Chamber Condenser Device, 7.

Lower Chamber 1, C1; falls between the lower part of the Multi-Chamber Device, 7, and 44b flat plate, where in its horizontal plane, 52, Chamber, 1, C1, consists of one or a plurality of bubbling systems, 53, FIG. 3.3, but not shown in FIG. 3.1, where the gases are bubbled through a column of liquid, of height between 5 and 40 cm, where each bubbling system is comprised of a plurality of porous or perforated ducts, 41, fed by a manifold, 42, which in turn is fed by the ducts, 11, FIG. 1, which discharges Collector Manifold, 4, from First Devices, 3. Manifold, 42, of the bubbling system of Device, 7, has a diameter ranging from 2.0 to 8.0 cm, and perforated or porous ducts, 41, have an inner diameter between 0.63 and 2.54 cm, with multiple perforations or porosity of diameters between 0.05 and 0.5 cm, with a total perforated area between 10 and 150 cm$^2$ for each connected First Device, 3. Chamber C1, in addition has a condensate overflow hole, 48, FIGS. 3.1 and 3.2 at a height comprised between 5 and 25 cm above the level of the bubbling system, through which the condensate over flows, and by gravity, discharges, and is collected and directed towards a common reservoir, 6, FIG. 1.

In a preferred embodiment of the invention, Chamber 1, C1, has a conical tapered bottom with a sludge discharge valve, and a height, measured from the level of the bubblers, between 20 and 80 cm. In its upper part, Chamber 1, C1, consists of two flat plates, 44a and 44b, tilting from the horizontal 0° to 30° but not touching, and with separation at the ends between 10 and 20 cm.

Chamber 2, C2, is comprised between flat plates 44b and 45b, and addition has flat plates, 45a and 45b, counter inclined similar to Chamber 1, with inclination from the horizontal between 0° and 30° and with separation from the farthest ends between 10 and 20 cm, and lodge a plurality of cooler tubes, 46, of inside diameters comprised between 10.0 and 12.0 mm, arranged parallel to each other and in bias, installed perpendicular to the upward flow of fluids. Tubes, 46, are externally cooled by natural air convection, forced air or through a cooled fluid to help substantial condensation of vapors entrained in the upward flow.

Chamber 3, C3, is comprised between the flat plates 45b and 47b, also consists of two flat plates, 47a and 47b, counter inclined similar and not touching each other, with inclination from the horizontal between 0° and 30° and with separation from the farthest ends between 10 and 20 cm. Chamber 3, C3, is filled with inert particles, 49, of granule size between 0.5 and 5.0 cm, to increase the contact surface and help the condensation of still uncondensed vapors entrained in the upward flow.

Finally, Chamber 4, C4, is comprised between flat plates, 47b, and the upper portion of the Second Multi-Chamber Device, 7, serves of the function of expansion chamber, may also opposite inclined flat plates (not shown in figure) not touching each other, with inclination from the horizontal 0° and 30°, and with separation at the farthest ends between 10 and 20 cm. Chamber, 4, is normally empty and eventually prepared to contain particulate matter suitable as chemical vapor trap of sulfuric acid and other residuals that might be present. Particulate material has a particle size between 0.5 and 5.0 cm.

The Systems of Measurement, Regulation and Control of extraction suction flows, 8 and 12. FIG. 1, and the Extraction Turbine, 9, are commonly used in the industrial handling of contaminated gases of today's art and are widely known by experts in the art; and therefore do not require detailed specification to be implemented in the System for Recovery/Recycling acid mist (SIRENA) of the present invention, according to the operation parameters such as the ones cited in the example below.

System for Recovery/Recycling Acid Mist (SIRENA) Operation Procedure

1. The System for Recovery/Recycling Acid Mist (SIRENA) (Ref. FIG. 1) is installed, without connecting the Exhaust Rigs, 2; add water to every First Device, 3, up to the level of overflow, hole 36 (FIG. 2.1).

2. Water is then added to the Second Multi-Chamber Condenser Device, 7, in Chamber 1 up to the overflow level, hole 48, (FIGS. 3.1 and 3.2).

3. Connect the Exhaust Rig, 2, of each cell, 1, to each First Catcher Device, 3 of the SIRENA System.

4. Open the atmosphere relief valve, V1, of the Extraction Turbine system, 9, and close the atmosphere relief valve, V2, and also close valve V3, which connects, 9, to the SIRENA System.

5. Start the Extraction Turbine, 9, and regulate the total extraction flow with the System Measurement, Regulation and Control of Flows, 8, depending on the extraction flow required by the number of cells connected to the SIRENA System.

6. Open valve, V3, downstream of the Second Multi-Chamber Device, 7, and close valve, V5, connecting Collector Manifold with the Second Multi-Chamber Device, 7, and open valve, V4, to the atmosphere.

7. Again regulate the turbine aspiration to keep the flow in the set point 5.

8. Close the relief valve to the atmosphere, V4, and open valve, V5.

9. Proceed to the individual regulation of the extraction flow from each cell according to the pre-established setting value according to the operating conditions of each cell using the System of Measurement, Control and Regulation of individual cell extraction 12.

Example of Implementation and Results

An industrial prototype of the System for Recovery/Recycling Acid Mist (SIRENA) was built and installed for continuous operation to recover and recycle the acid mist generated by four (4) copper electrowinning cells of 32 cathodes and 33 insoluble lead anodes (reference FIG. 1) in normal industrial operation, with sulfuric acid electrolyte of average $H_2SO_4$ 180 gram per liter and average temperature 45° C., operating with current density between 280 and 300 Am$^2$, at an altitude of approximately 500 m above sea level.

Power consumption and contents of sulfuric acid entrained in discharge flow of acid mist extracted from the cells and treated by the prototype SIRENA System, FIG. 1, were measured at the point of entry of the extraction turbine, before discharging the cleaned acid mist into ambient atmosphere.

Four individual First Devices, 3, were installed in the SIRENA System, one in each cell, of dimensions: height 310 mm, width 240 mm and length 310 mm, with a 15×15 cm, glass visor, and liquid overflow height of 10 cm above the level of the diffuser system, comprised of 8 acid mist bubbler diffuser lines, with a total perforated area of 14 cm$^2$.

A Second Multi-Chamber Condenser Device, 7, was installed, of dimensions: height 100 cm, width 30 cm and length 30 cm, comprising four Chambers with glass visors of 20×20 cm in Chambers 1, 2 and 3; Chamber 1 was supplied with a bubbler system, formed by three perforated tubes of 4 cm in diameter, with a total perforated area of 26 cm$^2$, and with an overflow hole for condensate located 10 cm above the level of bubbler System. Chamber 2 was equipped with cooler tubes chilled by ambient air circulation. Chamber 3 was filled with dry inert aggregate particles of diameters between 6 and 11 mm, and Chamber 4 was left empty.

Extraction flow of generated acid mist in each cell was regulated in a range between 180 and 220 liters per minute, which also guaranteed continuous sustained depression of 0.01 mbar in the confinement volume of each cell, that in turn assured null escape of acid mist to the working environment.

Results Obtained

Using the impermeable covers with flexible seals disclosed in Chilean Patent Application N° 1056-2013, the operating cells continuously infiltrated ambient air—in a range between 50% and 85% of the volume of gases and vapors in the acid mist generated by each cell—without observing any trace of emission of acid mist to the working environment at any time during the duration of the test, including the periods of cathode harvests. This result confirmed and validated the hypothesis that a modest volume of air infiltration from the environment—between 10% and 100%—of the gas and vapors in the acid mist generated in each operating cell, is effective not only to extract the acid mist from the cells but also sufficient to prevent any emission of hazardous gases from the cells to the working environment.

The power consumption of the extraction turbine used to aspirate the entire SIRENA System, was measured with a single phase electric meter, and indicated a total consumption of 74.4 KWH for 286.3 hours of continuous testing measurement of the System for Recovery/Recycling acid mist (SIRENA), which includes the power consumption of the extraction turbine used. This result is equivalent to a required power of 260 W for the global functioning of the SIRENA System, namely, for the extraction from the four electrolytic cells of 32 cathodes each operating continuously and the entire treatment and recycling of the acid mist generated, i.e. an electric power consumption of 65 W/cell, with the cells operating at 285 and 300 A/m$^2$ (including 30 liters per minute of air for electrolyte aeration in one cell).

Chemical measurements of $H_2SO_4$ content taken at the discharge flow of the System for Recovery/Recycling acid mist (SIRENA) to the extraction turbine indicated a stable maximum concentration 0.55 mg/Nm$^3$ of sulfuric acid, sustained over time. This level of contaminant purification efficiency in treated acid mist by SIRENA System comfortably meets the current Chilean legislation emission limit of 0.8 mg/Nm$^3$ of $H_2SO_4$ to the atmosphere.

To confirm the above, measurements of acid mist pressure drop in the flow through the SIRENA System prototype were also made, which showed 1100 mm $H_2O$ column; which for a global aspiration flow of 810 liter per minute for the 4 cells connected corresponds to a total power requirement of 140 W. The difference of 124 W with respect to the 264 W total determined by direct electrical measurement of power consumption corresponds to the power with which the gases discharge from the extraction turbine, a surplus of power that was available to drive the discharge of gases through an additional chemical filter system, to ensure capability to meet even lower limits of contaminants, below 0.55 mg/Nm$^{3'}$, when and if required.

Condensates collected from drops of electrolyte and sulfuric acid and water vapors generated by each cell, collected in the four First Devices, 3 and the Second Multi-Chamber Condenser Device, 7, were also measured, showing a daily average of 3.3±1 liters per cell during the test (conducted in spring/summer).

In the course of the test, no $CuSO_4$ crystallization build-ups, obstructions or corrosion of any element or component of the prototype SIRENA System were observed, including its Systems of Measurement, Control and Regulation of Flows, nor in the extraction turbine.

The invention claimed is:

1. A system for recovering and recycling acid mist that contains very fine droplets of electrolyte in suspension, vapors of sulfuric acid and water vapors generated in electrolytic cells for electrowinning of non-ferrous metals, said system comprising:
    a) an acid mist exhaust rig installed in each electrolytic cell of a plurality of electrolytic cells, wherein said acid mist exhaust rig having a plurality of suction windows for continuously removing acid mist from a volume of confinement of said each electrolytic cell;
    b) a first condensation device installed on said each electrolytic cell and connected to said exhaust rig, said first condensation device for substantially trapping very fine drops of electrolyte suspended in said acid mist exhaust and partially condensing vapors of sulfuric acid and water suspended in said acid mist exhaust and partially condensing vapors of sulfuric acid and water entrained in said acid mist exhaust and producing a first condensate
    c) a collector manifold connecting one or more of said first condensation device, said collector manifold receiving said first condensate and at least a residual flow of gas and uncondensed vapors from said one or more first condensation device;
    d) a second condensation device for receiving said first condensate and said at least said residual flow of gas and uncondensed vapors from said first condensation device through said collector manifold, and for producing a second condensate, wherein said second condensate containing the majority of said sulfuric acid in said acid mist exhaust, and wherein said second condensation device is connected back to said each electrolytic cell for returning said second condensate to said each electrolytic cell, and wherein said second condensation device is a multi-chamber device configure to discharge a residual gas; and
    e) a set of measurement, control and regulation devices for controlling a flow of said acid mist exhaust, further comprising:
    a first device installed in said each electrolytic cell for controlling said continuously removing of said acid mist exhaust; and
    a second device for controlling said acid mist exhaust from said plurality of said electrolytic cells.

2. A system according to claim 1, wherein said acid mist exhaust rig further comprising a plurality of ducts that merge into one duct to feed said first condensation device.

3. A system according to claim 1, wherein said acid mist exhaust rig is installed in an end wall of said each electrolytic cell.

4. A system according to claim 1, wherein said first condensation device is a rectangular container of dimensions: length comprised between 25 and 50 cm; width, comprised between 15 to 40 cm and height, between 25 and 50 cm, where the bottom portion of said first condensation device having a shape from a set of shapes consisting of flat, conical and tapered, and further comprising a valve to discharge sludge.

5. A system according to claim 4, wherein said first condensation device further having a bottom portion equipped with a system to trap electrolyte drops, which passes the Acid Mist in the shape of bubbles upwards through a liquid column, where said bubbling system is formed by a plurality of parallel perforated ducts, fed from said collector manifold wherein said collector manifold has an inside diameter between 1.0 and 3.0 cm, and the perforated ducts have an inside diameter comprised between 0.63 and 2.54 cm, with a plurality of perforations having diameters comprised between 0.05 and 0.5 cm, and wherein the total perforated area of said first condensation device is comprised between 10 and 150 $cm^2$.

6. A system according to claim 5, wherein said liquid column further having a height comprised between 5 and 20 cm where the Acid Mist ascends in the form of bubbles.

7. A system according to claim 4, wherein said first condensation device further having a discharge hole for condensate overflow located at a height between 5 and 25 cm above the level of the bubbler system, where the liquid spills over and discharges by gravity wherein an upper portion of said first condensation device further provides two or more flat plates or baffles, arranged horizontal to the ascending passage of fluids.

8. A system according to claim 1, wherein said second condensation device further comprising four Chambers, wherein its global dimensions are dependent on the number of said first condensation device connected to said collector manifold wherein its section is comprised between 50 and 600 $cm^2$ for each of said first condensation device connected to it, and further having a height comprised between 50 and 300 cm.

* * * * *